US008108010B2

(12) United States Patent
Miyake

(10) Patent No.: US 8,108,010 B2
(45) Date of Patent: Jan. 31, 2012

(54) IN-VEHICLE HANDSFREE APPARATUS

(75) Inventor: Kenji Miyake, Anjo (JP)

(73) Assignee: Denso Corporation, Kariya (JP)

( * ) Notice: Subject to any disclaimer, the term of this patent is extended or adjusted under 35 U.S.C. 154(b) by 638 days.

(21) Appl. No.: 12/288,502

(22) Filed: Oct. 21, 2008

(65) Prior Publication Data

US 2009/0111529 A1    Apr. 30, 2009

(30) Foreign Application Priority Data

Oct. 29, 2007  (JP) ................................. 2007-280290

(51) Int. Cl.
*H04M 1/00* (2006.01)
*H04M 3/00* (2006.01)

(52) U.S. Cl. ................ 455/569.2; 455/569.1; 455/575.9; 455/564; 704/275

(58) Field of Classification Search ............... 455/569.2, 455/569.1, 575.9, 564; 704/275
See application file for complete search history.

(56) References Cited

U.S. PATENT DOCUMENTS

| 6,735,516 | B1 * | 5/2004 | Manson ........................ 701/209 |
| 6,985,753 | B2 * | 1/2006 | Rodriguez et al. ......... 455/550.1 |
| 7,194,257 | B2 * | 3/2007 | House et al. .................. 455/418 |
| 7,251,507 | B2 | 7/2007 | Kitao et al. |
| 2006/0166662 | A1 | 7/2006 | Nah |
| 2006/0262103 | A1 * | 11/2006 | Hu et al. ....................... 345/173 |
| 2007/0178944 | A1 | 8/2007 | Mitsuru et al. |
| 2008/0085745 | A1 | 4/2008 | Ozaki |
| 2009/0011799 | A1 * | 1/2009 | Douthitt et al. ............ 455/569.1 |
| 2009/0061951 | A1 * | 3/2009 | Giese et al. ................ 455/569.2 |

FOREIGN PATENT DOCUMENTS

| JP | 10-107912 | 4/1998 |
| JP | 2000-184042 | 6/2000 |
| JP | 2001-119452 | 4/2001 |
| JP | 2002-9899 | 1/2002 |
| JP | 2002-193046 | 7/2002 |
| JP | 2002-291044 | 10/2002 |
| JP | 2006-135915 | 5/2006 |
| JP | 2006-211672 | 8/2006 |

OTHER PUBLICATIONS

Office action dated Aug. 4, 2009 in corresponding Japanese Application No. 2007-280290.

\* cited by examiner

*Primary Examiner* — Edward Urban
*Assistant Examiner* — Walter Dreksler
(74) *Attorney, Agent, or Firm* — Harness, Dickey & Pierce, PLC

(57) ABSTRACT

An in-vehicle handsfree apparatus performs a dialing control with a first dialing phone number, which is a phone number included in historical data of outgoing or incoming calls of a cellular phone. If the destination of the dialing with the first phone number does not answer, the handsfree apparatus performs a dialing control by using a different second phone number, if it is available from the cellular phone. The second phone number, e.g., a number of a home telephone, is registered in phone book data of the cellular phone by using the same registration name as that of the first phone number; further, the second phone number is transmitted from the cellular phone to the handsfree apparatus.

11 Claims, 5 Drawing Sheets

FIG. 2A

HISTORICAL DATA OF OUTGOING CALL

| ORDER | OUTGOING TIME | DESTINATION |
|---|---|---|
| 01 | 08/10/12:40 | 09011111111 |
| 02 | 08/10/11:22 | 09022222222 |
| 03 | 08/10/09:57 | 0566555555 |
| 04 | 08/10/09:35 | 0566223333 |
| 05 | 08/10/08:40 | 09011111111 |
| 06 | 08/10/07:28 | 0524444444 |
| 07 | 08/09/21:40 | 09066661111 |
| ⋮ | ⋮ | ⋮ |
| 20 | 08/08/11:50 | 09066661111 |

FIG. 2B

HISTORICAL DATA OF INCOMING CALL

| ORDER | INCOMING TIME | SOURCE |
|---|---|---|
| 01 | 08/10/11:20 | 09066661111 |
| 02 | 08/10/10:42 | 09066661111 |
| 03 | 08/10/09:33 | 0566223333 |
| 04 | 08/10/08:11 | 0566223333 |
| 05 | 08/10/07:40 | 0522223333 |
| 06 | 08/10/22:15 | 09011113333 |
| 07 | 08/09/12:40 | 09044443333 |
| ⋮ | ⋮ | ⋮ |
| 20 | 08/08/18:56 | 09044447777 |

FIG. 3

PHONE BOOK DATA

| ORDER | REGISTRATION NAME | CATEGORY | PHONE NO. / EMAIL ADDRESS |
|---|---|---|---|
| 01 | YAMADA ○○ | CELL PHONE | 09011111111 |
| | | HOME | 0566997777 |
| | | OFFICE | 0566553333 |
| | | EMAIL ADDRESS | yamada@abc.com |
| 02 | TANAKA ○○ | CELL PHONE | 09066661111 |
| | | HOME | 0522226666 |
| | | OFFICE | 0529994444 |
| | | EMAIL ADDRESS | tanaka@yyz.com |
| 03 | OOTA ○○ | CELL PHONE | 09011113333 |
| | | HOME | 0566662222 |
| | | OFFICE | 0566881111 |
| | | EMAIL ADDRESS | oota@pgr.com |
| ⋮ | ⋮ | ⋮ | ⋮ |
| 500 | | | |

IN-VEHICLE HANDSFREE APPARATUS

CROSS REFERENCE TO RELATED APPLICATION

This application is based on and incorporates herein by reference Japanese Patent Application No. 2007-280290 filed on Oct. 29, 2007.

FIELD OF THE INVENTION

The present invention relates to an in-vehicle handsfree apparatus.

BACKGROUND OF THE INVENTION

Patent Document 1: JP 2002-193046 A (corresponding to US 2007/0178944)

For instance, Patent document 1 discloses a handsfree phone call as follows. For example, a user carries a cellular phone with a Bluetooth (registered trademark) communication function. The user gets in a vehicle equipped with a handsfree apparatus having the Bluetooth communication function. When the cellular phone and the in-vehicle handsfree apparatus are covered within the Bluetooth communication area, a HFP (HandsFree Profile) for specifying a handsfree phone call therebetween is connected to thereby realize a handsfree phone call by the in-vehicle handsfree apparatus using the cellular phone.

A user relatively often performs a dialing operation by using a phone number included in historical data of incoming or outgoing calls. In such a case, if the destination of the dialing does not answer, the dialing operation is once ended and an additional operation needs to be performed. That is, the user may then search the phone book data registered in the cellular phone and selects a different phone number, such as a phone number of a home telephone.

In contrast, there is a handsfree apparatus or a cellular phone compliant with a PBAP (Phone Book Access Profile) which specifies transmission of phone book data. If the PBAP is available between the handsfree apparatus and cellular phone, phone book data registered in the cellular phone can be transmitted to the handsfree apparatus by connecting the PBAP therebetween. A data volume of the phone book data (due to the large number of registrations) is generally significantly large. This results in requiring a great time to transmit the phone book data from the cellular phone to the in-vehicle handsfree apparatus. In addition, this results in requiring a storage area in the in-vehicle handsfree apparatus for storing such a large data volume of the received phone book data.

SUMMARY OF THE INVENTION

It is an object to provide an in-vehicle handsfree apparatus to improve operability in dialing or outgoing call without need of transmission of phone book data having a large data volume from a cellular phone.

According to an example of the present invention, an in-vehicle handsfree apparatus is provided as follows. A handsfree connection section is configured to connect a protocol to perform a handsfree phone call with a cellular phone. A historical call data acquisition section is configured to acquire, from the cellular phone, historical data on phone number of at least one of an outgoing call and an incoming call of the cellular phone. A control section is configured to perform a first dialing control using a first phone number included in the acquired historical data on phone number under a condition that a user performs a predetermined operation via an operation section in a state that a protocol for performing the handsfree phone call with the cellular phone is connected by the handsfree connection section. A phone book data acquisition section is configured to acquire a phone number of phone book data in which registration information is associated with more than one phone number. Herein, when (i) a destination in the first dialing control using the first phone number does not answer and (ii) a second phone number, which is different from the first phone number, is registered in the registration information of the first phone number, the control section is further configured to cause the phone book data acquisition section to acquire the second phone number from the cellular phone and perform a second dialing control by using the acquired second phone number.

In the above configuration of the in-vehicle handsfree apparatus, the operability in dialing can be improved without need of transmission of phone book data having a large data volume from a cellular phone.

BRIEF DESCRIPTION OF THE DRAWINGS

The above and other objects, features, and advantages of the present invention will become more apparent from the following detailed description made with reference to the accompanying drawings. In the drawings:

FIGS. 2A and 2B illustrate examples of historical data of outgoing and incoming calls of a cellular phone, respectively;

FIG. 3 is an example of phone book data of the cellular phone;

DETAILED DESCRIPTION OF THE PREFERRED EMBODIMENTS

Figure 1:
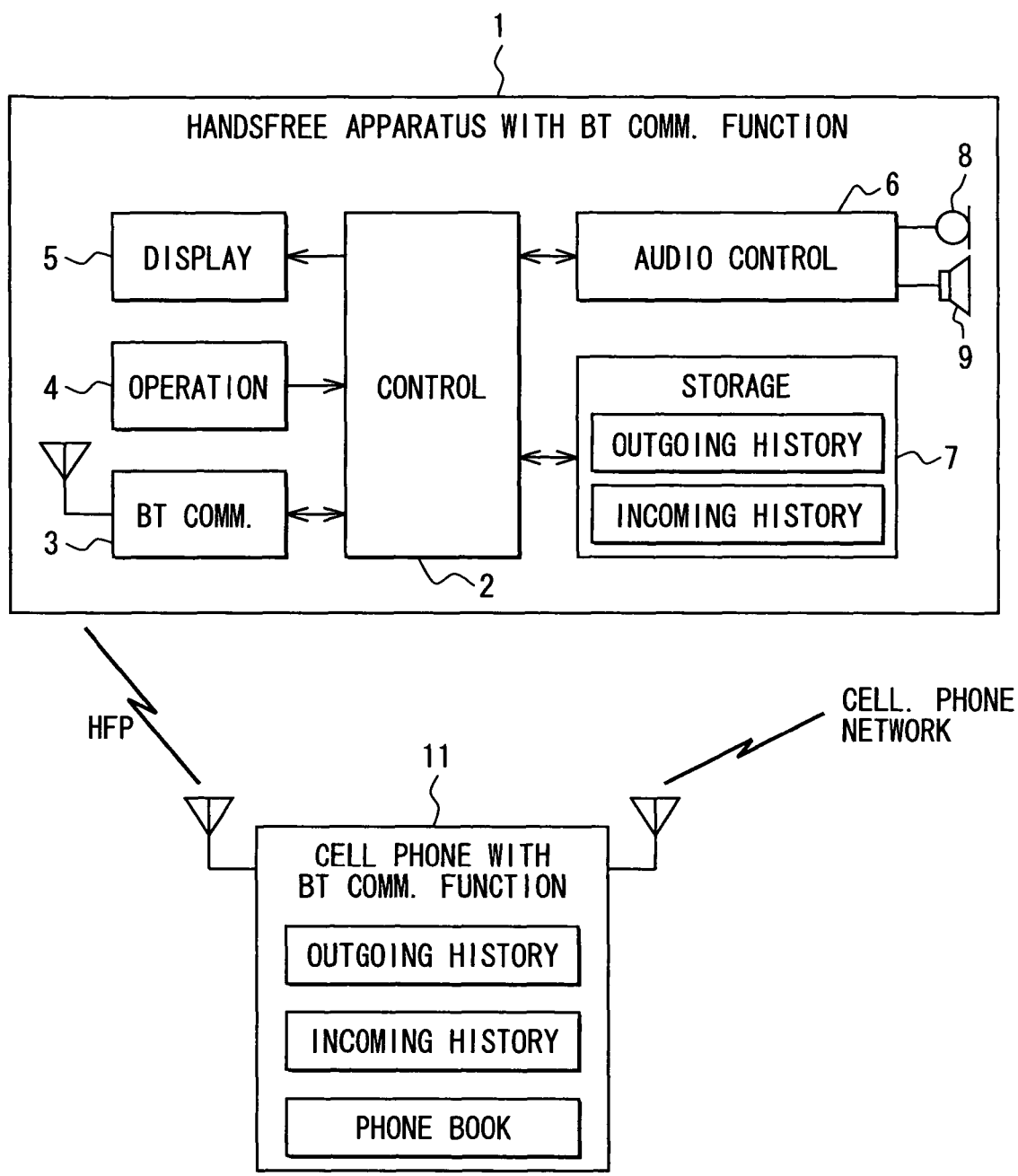
FIG. 1 is a functional block diagram according to a first embodiment of the present invention.

An in-vehicle handsfree apparatus having a Bluetooth communication function as an embodiment of the present invention is explained with reference to drawings. FIG. 1 illustrates a functional block diagram of an in-vehicle handsfree apparatus 1. The in-vehicle handsfree apparatus 1 includes the following: a control section 2 (also functioning as an example of a control means or a present time acquisition means or section); a Bluetooth communication section 3 (also functioning as an example of a handsfree connection means or section, a historical incoming data acquisition means or section, a historical outgoing data acquisition means or section, a historical call data acquisition means or section, or a phone book data acquisition means or section); an operation section 4 (also functioning as an example of an operation means); a display section 5 (functioning as an example of a display means); an audio control section 6; and a storage section 7.

The control section 2 controls an overall operation such as communication operation, data management operation, and present time management of the in-vehicle handsfree apparatus 1. If a cellular phone 11 having a Bluetooth communication function is present within a Bluetooth communication area, the Bluetooth communication section 3 connects or communicates a HFP (Hands Free Profile) for specifying a handsfree phone call with a cellular phone 11 to thereby realize a handsfree phone call by using the cellular phone 11.

The operation section 4 includes multiple keys operable by a user, and outputs to the control section 2 an operation signal corresponding to the key operated by the user. The display section 5 includes, for example, a color liquid crystal display. The display section 5 displays a display window based on a display instruction signal inputted from the control section 2. The audio control section 6 performs sound processing for sounds inputted via the microphone 8 and sounds outputted via the speaker 9. In addition, the microphone 8 is installed in a position at which it is easy to pick up speeches uttered by users, such as a position adjacent to the steering wheel. The speaker 9 is installed, for example, to be used also as a speaker of an in-vehicle audio device.

The storage section 7 includes a historical outgoing data storage area for storing historical data of outgoing calls (also called historical outgoing data), and a historical incoming data storage area for storing historical data of incoming calls (also called historical incoming data). The control section 2 stores, in the historical outgoing data storage area of the storage section 7, historical outgoing data transmitted via the Bluetooth communication section 3 from the cellular phone 11 while storing in the historical incoming data storage area of the storage section 7, historical incoming data transmitted via the Bluetooth communication section 3 to the cellular phone 11. In addition, the handsfree apparatus 1 is started or stopped in conjunction with an ACC (Accessory Switch) turning ON or OFF, respectively.

In contrast, the cellular phone 11 is configured to store historical outgoing data, up to a predetermined number, showing a history of phone numbers functioning as dialing destinations of outgoing calls via a cellular phone network. A destination can be referred to as a recipient. The cellular phone 11 is further configured to store historical incoming data, up to a predetermined number, showing a history of phone numbers functioning as calling sources of incoming calls via the cellular phone network. A source can be referred to as a sender. Further, the cellular phone 11 stores phone book data, which the user registers by operating the cellular phone 11, up to a predetermined number.

As illustrated in FIG. 2A, the historical outgoing data stored in the cellular phone 11 include a predetermined number (for example, 20) of data items in which times and phone numbers for dialing or outgoing calls are associated with each other. When a new dialing occurs to thereby exceed the predetermined number, the earliest data item among the predetermined number stored at that time is erased from the historical data and a data item corresponding to the new dialing is added to thereby update the historical data. In contrast, as illustrated in FIG. 2B, the historical incoming data stored in the cellular phone 11 include a predetermined number (for example, 20) of data items in which times and phone numbers for incoming calls are associated with each other. In similarity with those in the above-mentioned historical outgoing data, when a new incoming call occurs to thereby exceed the predetermined number, the earliest data item among the predetermined number stored at that time is erased from the historical data and a data item corresponding to the new incoming call is added to thereby update the historical data.

Further, as illustrated in FIG. 3, the phone book data stored in the cellular phone 11 include a predetermined number (for example, 500) of data items in which (i) registration names as registration information, (ii) categories classified by phone types or positions for installing phones), (iii) phone numbers, and (iv) email addresses, etc. are associated with each other. Thus, one registration name can be corresponded to by or associated with multiple categories, each of which corresponds to a phone number or email address, as shown in FIG. 3.

Figure 4:
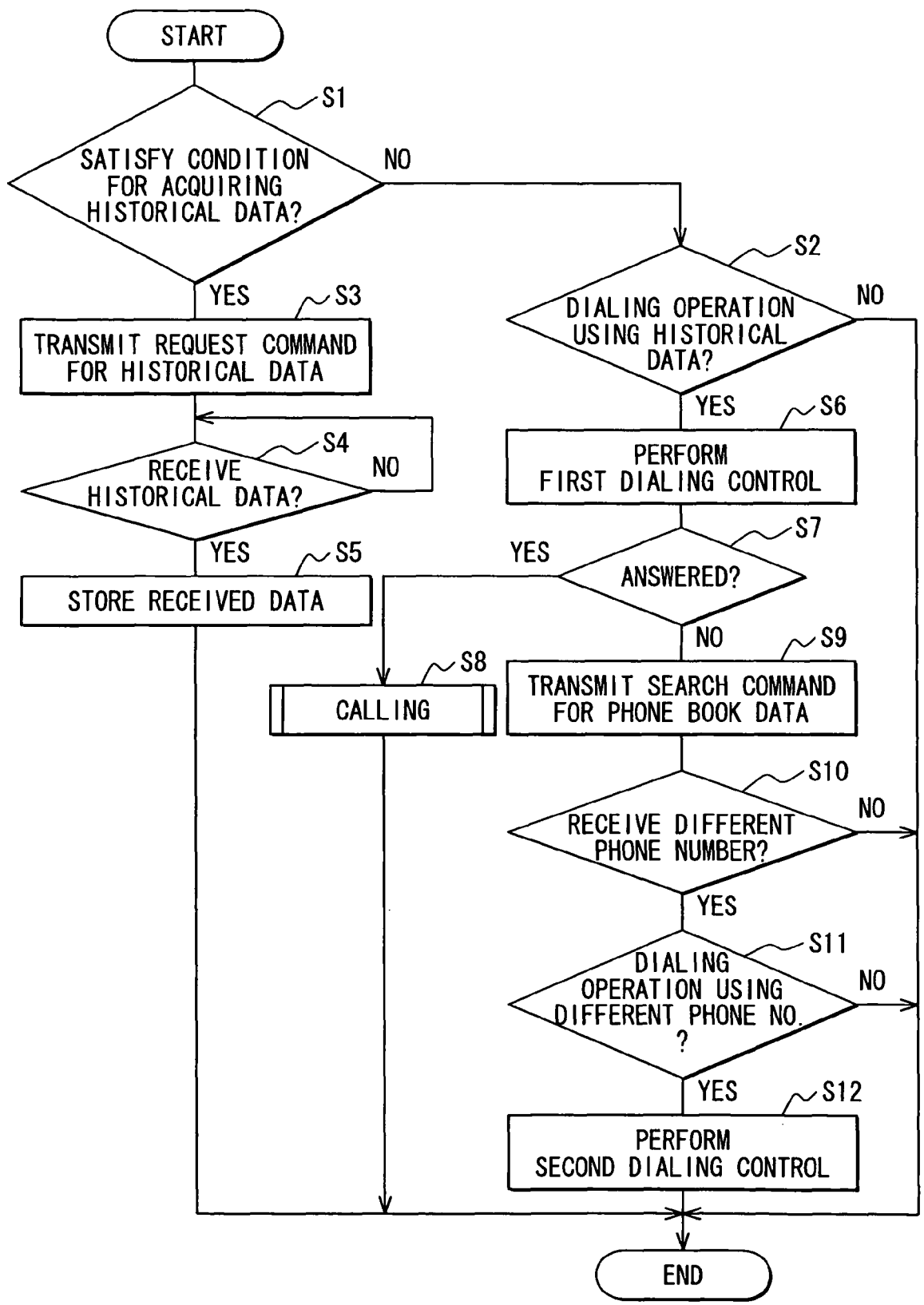
FIG. 4 is a flowchart.

An operation under the above configuration is explained with reference to FIGS. 4 and 5A to 5E. FIG. 4 illustrates a flowchart of a process executed by the control section 2 of the in-vehicle handsfree apparatus 1. The control section 2 determines at S1 whether a condition for acquiring historical outgoing data and historical incoming data (hereinafter also referred to collectively as historical data) from the cellular phone 11 is satisfied. Simultaneously, the control section 2 determines at S2 whether a user performs via the operation section 4 a dialing operation (e.g., outgoing call operation) using a phone number included in the historical outgoing data or historical incoming data.

When the control section 2 determines at S1 that a condition for acquiring historical outgoing data and historical incoming data from the cellular phone 11 is satisfied, the Bluetooth communication section 3 is caused to transmit to the cellular phone 11 a request command to request historical outgoing data and historical incoming data at S3. The control section 2 waits for (or determines) reception of the historical data via the Bluetooth communication section 3 from the cellular phone 11 at S4. When the cellular phone 11 receives the request command from the in-vehicle handsfree apparatus 1, the cellular phone 11 transmits historical outgoing data and historical incoming data which are stored at that time to the in-vehicle handsfree apparatus 1.

When the control section 2 determines at S4 that the historical outgoing data and historical incoming data are received via the Bluetooth communication section 3, the control section 2 stores the received historical outgoing data and historical incoming data in the respective storage areas of the storage section 7 and thus updates the historical outgoing data and historical incoming data of the storage section 7 at S5.

Herein, the condition for acquiring the historical outgoing data and historical incoming data from the cellular phone 11 is as follows. At least, the cellular phone 11 needs to be present within a Bluetooth communication area of the Bluetooth communication section 3. Further, for example, the control section 2 needs to collate the historical outgoing data and historical incoming data stored in the storage section 7 with those stored in the cellular phone 11 and determine that the historical data in the storage section 7 and the historical data in the cellular phone 11 do not accord with each other. When the control section 2 determines that the historical data in the storage section 7 and the historical data in the cellular phone 11 do not accord with each other, it is thus determined that the condition for acquiring the historical outgoing data and historical incoming data from the cellular phone 11 is satisfied.

Further, alternatively, the control section 2 may not need to collate the historical outgoing data and historical incoming data stored in the storage section 7 with those stored in the cellular phone 11. In such a case, when it is determined that the cellular phone 11 exists within a Bluetooth communication area of the Bluetooth communication section 3, it may be determined that the condition for acquiring the historical outgoing data and historical incoming data from the cellular phone 11 is satisfied.

In addition, the number of the historical outgoing data or historical incoming data in the corresponding historical data storage area may be larger than that of the cellular phone 11. In such a case, the control section 2 causes the cellular phone 11 to transmit all the historical outgoing data and the historical incoming data stored in the cellular phone 11 and stores the received historical outgoing data and historical incoming data in the corresponding storage areas of the storage section 7 of the handsfree apparatus 1. By contrast, the former may be smaller than the latter. In such a case, the control section 2 causes the cellular phone 11 to preferentially transmit a selected part (corresponding to data item having new date and time) of the historical outgoing data or incoming data stored in the cellular phone 11 and stores the received part of the historical outgoing and incoming data in the corresponding storage areas of the storage section 7 of the handsfree apparatus 1.

Figure 5A:
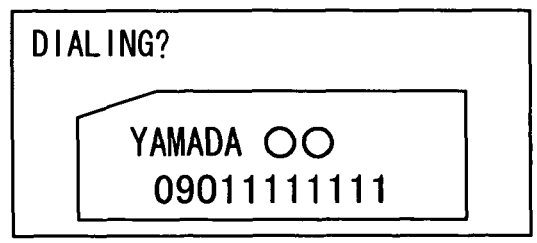
FIGS. 5A to 5E illustrate examples of changes in a display window.
Figure 5B:
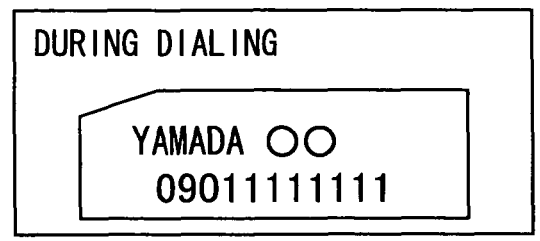

In contrast, when the control section 2 determines at S2 that a user performs via the operation section 4 a dialing operation (also referred to as a first dialing operation) using a phone number (also referred to as a first phone number) included in the historical outgoing data or historical incoming data, the control section 2 performs as a first dialing control a dialing control by using the first phone number included in the historical outgoing data or the historical incoming data at S6. Then, the control section 2 determines at S7 whether the destination of the dialing or outgoing call answers. In such a case, the control section 2 displays on the display section 5 a display guidance for prompting the user to perform a dialing operation such as "dialing?". Among the phone numbers of the historical outgoing data or incoming data, information about a calling destination (also called a destination for dialing) is simultaneously displayed in the display section 5. The information about the calling destination includes a phone number of a cellular phone selected by the user (for example, "09011111111" in FIG. 5A) and a registration name (for example, "YAMADA OO" in FIG. 5A) corresponding to the selected phone number. When the user performs the dialing operation, the control section 2 replaces the above-mentioned display guidance "dialing?" by a display guidance "during dialing" for notifying the user that dialing takes place in the display section 5, as shown in FIG. 5B.

Figure 5C:
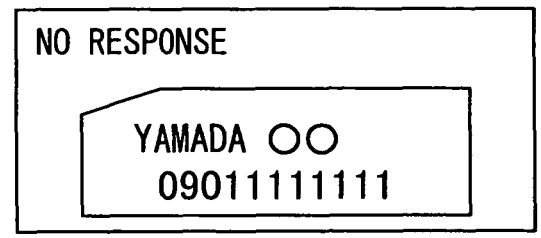

When the control section 2 determines at S7 that the calling destination answers, the control section 2 advances the processing to S8, where a calling process takes place with the calling destination thereafter. In contrast, when the control section 2 determines at S7 that the calling destination does not answer, the control section 2 replaces the above-mentioned display guidance "during dialing" by a display guidance "no response" in the display section 5, as shown in FIG. 5C. The control section 2 causes the Bluetooth communication section 3 to transmit to the cellular phone 11 a search command to search the phone book data along with the dialing phone number, i.e., the first phone number, at S9. The control section 2 waits for reception of a second phone number via the Bluetooth communication section 3 from the cellular phone 11 at S10. The second phone number is a different phone number having the same registration name as that of the first phone number of the previously used as the dialing phone number. When receiving the search command from the in-vehicle handsfree apparatus 1, the cellular phone 11 searches the phone book data registered at that time for the relevant second phone number.

If a different or additional phone number as the second phone number is registered in the same registration name as that of the phone number used as the first phone number in the first dialing call in the in-vehicle handsfree apparatus 1, such a different phone number as the second phone number is transmitted to the in-vehicle handsfree apparatus 1.

Figure 5D:
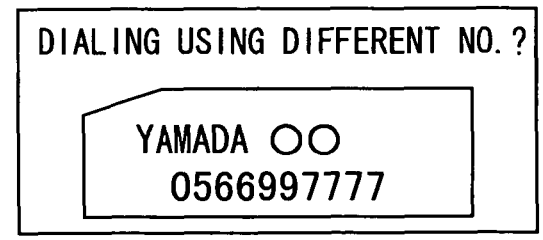

When the control section 2 determines at S10 that the different phone number registered in the same registration name as the second phone number is received via the Bluetooth communication section 3, the control section 2 replaces the above-mentioned display guidance "no response" by a display guidance "dialing using different number?" in the display section 5, as shown in FIG. 5D. Herein, information about the second phone number is simultaneously displayed in the display section 5. The information about the second phone number includes a different phone number as the second phone number (for example, "0566997777" of a phone number of a home telephone in FIG. 5D) and a registration name (for example, "YAMADA OO" in FIG. 5D) corresponding to the second phone number.

Figure 5E:
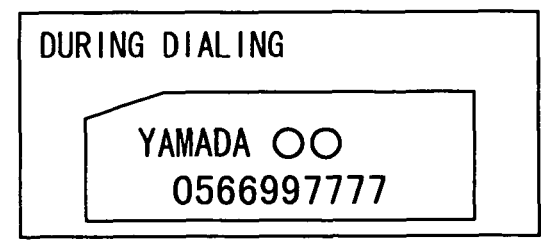

When the control section 2 then determines at S11 that the user performs via the operation section 4 a dialing operation as a second predetermined dialing operation, the control section 2 performs at S12 as a second dialing control a dialing control using the second phone number, i.e., the different phone number having the same registration name as that of the first phone number. Herein, the control section 2 replaces the above-mentioned display guidance "dialing using different number?" by a display guidance "during dialing" in the display section 5, as shown in FIG. 5E.

Under the above configuration of the handsfree apparatus 1, when the first dialing operation using the phone number stored in the historical outgoing data or historical incoming data is not answered by the relevant calling destination, a different phone number registered in the same registration name is then acquired, if available, from the cellular phone 11 to thereby allow to perform the second dialing control without need of a search operation for searching the phone book data registered in the cellular phone 11.

In addition, the above embodiment explains the example, in which the second dialing control using the second phone number having the same registration name as that of the first phone number is performed when a condition is satisfied that the second phone number is displayed and the user performs the second dialing operation. However, alternatively, without such a condition satisfied, the second dialing control may be performed automatically.

In addition, the above embodiment explains an example, in which when multiple different phone numbers registered in the same registration name are present, a phone number in the higher registration order (i.e., the phone number having a registration order next to that of the first phone number) is acquired from the cellular phone 11. For instance, in FIG. 3, a phone number of a home telephone is selected as the second phone number instead of a phone number of an office. However, alternatively, all the multiple phone numbers may be simultaneously acquired from the cellular phone 11 and displayed as a list; then, a user may be allowed to select one of the listed multiple phone numbers via the operation section 4. In addition, a time zone may be registered to each category of multiple phone numbers. In such a case, a different phone number as the second phone number used for the second dialing control can be selected based on the time zone including the present clock time.

For example, a category of a cellular phone may include a time zone "from 5:00 p.m. to 6:00 p.m" and "from 7:00 a.m. to 8:00 a.m." A category of a home telephone may include a time zone "from 6:00 p.m. to 7:00 a.m." A category of an office may include a time zone "from 8:00 a.m. to 5:00 p.m." In the second dialing control, a second phone number including a present clock time in its time zone of the category may be acquired from the cellular phone 11 among the multiple phone numbers.

In the above configuration of the embodiment of the handsfree apparatus 1, the operability in dialing can be improved without need of transmission of phone book data having a large data volume from the cellular phone 11.

The present invention is not limited only to the above-mentioned embodiment, and can be modified or extended as follows. The present invention may be directed to not only to an in-vehicle navigation apparatus but also to any in-vehicle apparatus having a handsfree function such as an in-vehicle navigation apparatus. Further, the historical data transmitted from the cellular phone 11 may not be limited to both the incoming data and the outgoing data. The historical data transmitted from the cellular phone 11 may alternatively be either the incoming data or the outgoing data. The communication method for transmitting the various data between the handsfree apparatus 1 and the cellular phone 11 may not be limited to the Bluetooth communication. For instance, another wireless communication method or wire (or cable) communication method may be alternatively used for transmitting the various data therebetween. The condition for acquiring the historical data from the cellular phone 11 may be alternatively designed as needed.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, an in-vehicle handsfree apparatus is provided as follows. A handsfree connection section is configured to connect a protocol to perform a handsfree phone call with a cellular phone. A historical call data acquisition section is configured to acquire, from the cellular phone, historical data on phone number of at least one of an outgoing call and an incoming call of the cellular phone. A control section is configured to perform a first dialing control using a first phone number included in the acquired historical data on phone number under a condition that a user performs a predetermined operation via an operation section in a state that a protocol for performing the handsfree phone call with the cellular phone is connected by the handsfree connection section. A phone book data acquisition section is configured to acquire a phone number of phone book data in which registration information is associated with more than one phone number. Herein, when (i) a destination in the first dialing control using the first phone number does not answer and (ii) a second phone number, which is different from the first phone number, is registered in the registration information of the first phone number, the control section is further configured to cause the phone book data acquisition section to acquire the second phone number from the cellular phone and perform a second dialing control by using the acquired second phone number.

In the above configuration of the in-vehicle handsfree apparatus, the operability in dialing can be improved without need of transmission of phone book data having a large data volume from a cellular phone.

As an optional aspect, the control section may be further configured to cause a display section to display the second phone number different from the first phone number and acquired by the phone book data acquisition section from the cellular phone. Thereby, the user can recognize another phone number acquired from the cellular phone.

As an optional aspect, the control section may be further configured to automatically perform the second dialing control by using the acquired second phone number, without condition that the user performs, via the operation section, another predetermined operation. Thus, the dialing control by using the different phone number acquired from the cellular phone can be executed promptly, without need of any operation by the user.

As an optional aspect, the control section may be further configured to perform the second dialing control by using the acquired second phone number, under condition that the user performs, via the operation section, another predetermined operation. Thus, the use can determine whether to perform the dialing control by using the different phone number acquired from the cellular phone.

As an optional aspect, when more than one phone number different from the first phone number is registered in the registration information of the first phone number, the control section may be further configured to acquire as the second phone number a phone number having a higher registration order among the more than one phone number, via the phone book data acquisition section. Thus, the dialing control using a phone number having a higher registration order can be preferentially executed.

As an optional aspect, a present time acquisition section may be further configured to acquire a present time, wherein when more than one phone number different from the first phone number is registered in the registration information of the first phone number, the control section is further configured to acquire as the second phone number a phone number corresponding to the acquired present time among the more than one phone number via the phone book data acquisition section. Thus, the dialing control using a phone number corresponding to the present time can be preferentially executed.

It will be obvious to those skilled in the art that various changes may be made in the above-described embodiments of the present invention. However, the scope of the present invention should be determined by the following claims.

What is claimed is:

1. An in-vehicle handsfree apparatus performing a handsfree phone call with a cellular phone,
the cellular phone storing (i) a plurality of phone book data, each phone book data containing registration information in association with more than one phone number, and (ii) historical call data on phone numbers of at least one of an outgoing call and an incoming call of the cellular phone,
the in-vehicle handsfree apparatus comprising:
a handsfree connection section configured to connect a protocol to perform a handsfree phone call with the cellular phone;
a historical call data acquisition section configured to acquire, from the cellular phone, historical call data;
a phone book data acquisition section configured to acquire a phone number from the phone book data stored in the cellular phone; and
a control section configured to perform a first dialing control using a first phone number included in the acquired historical call data under a condition that a user performs a predetermined operation via an operation section in a state that a protocol for performing the handsfree phone call with the cellular phone is connected by the handsfree connection section;
wherein when (i) a destination in the first dialing control using the first phone number does not answer and (ii) a second phone number, which is different from the first phone number, is registered in the registration information of the first phone number, the control section is further configured to cause the phone book data acquisition section to acquire the second phone number from the plurality of phone book data in the cellular phone and perform a second dialing control by using the acquired second phone number.

2. The in-vehicle handsfree apparatus according to claim 1, wherein the control section is further configured to cause a display section to display the second phone number different from the first phone number and acquired by the phone book data acquisition section from the cellular phone.

3. The in-vehicle handsfree apparatus according to claim 1, wherein the control section is further configured to automatically perform the second dialing control by using the acquired second phone number, without condition that the user performs, via the operation section, another predetermined operation.

4. The in-vehicle handsfree apparatus according to claim 1, wherein the control section is further configured to perform the second dialing control by using the acquired second phone number, under condition that the user performs, via the operation section, another predetermined operation.

5. The in-vehicle handsfree apparatus according to claim 1, wherein when more than one phone number different from the first phone number is registered in the registration information of the first phone number, the control section is further configured to acquire as the second phone number a phone number having a higher registration order among the more than one phone number, via the phone book data acquisition section.

6. The in-vehicle handsfree apparatus according to claim 1, further comprising:

a present time acquisition section configured to acquire a present time, wherein when more than one phone number different from the first phone number is registered in the registration information of the first phone number, the control section is further configured to acquire as the second phone number a phone number corresponding to the acquired present time among the more than one phone number via the phone book data acquisition section.

7. The in-vehicle handsfree apparatus according to claim 1, further comprising:

a storage section to contain a historical call data storage area, wherein the control section causes the historical call data acquisition section to acquire a part or all of the historical call data from the cellular phone based on (i) a number of the historical call data stored in the cellular phone and (ii) a number of historical call data enabled to be stored in the historical call data storage area.

8. The in-vehicle handsfree apparatus according to claim 7, wherein:

the control section causes the historical call data acquisition section to acquire a part of the historical call data from the cellular phone based on when the number of historical call data enabled to be stored in the historical call data storage area is smaller than the number of the historical call data stored in the cellular phone; and the control section causes the storage section to update the historical call data storage area by storing, in the historical call data storage area, the part of the historical call data acquired from the cellular phone.

9. The in-vehicle handsfree apparatus according to claim 1, wherein the data acquisition section acquires only the second phone number from the plurality of phone book data when the destination in the first dialing control using the first phone number does not answer.

10. A method by a control section included in an in-vehicle handsfree apparatus for acquiring a phone number from a cellular phone;

the in-vehicle handsfree apparatus further including a communication section that is presently under a connection state of connecting a protocol to perform a handsfree phone call with the cellular phone, the cellular phone storing (i) a plurality of phone book data items, each phone book data item containing a registration name in association with more than one phone number, and (ii) historical call data on phone numbers of at least one of an outgoing call and an incoming call of the cellular phone, the method comprising:

acquiring the historical call data on phone numbers from the cellular phone via the communication section;

performing a first dialing control using a first phone number included in the acquired historical call data under a condition that a user performs a predetermined operation via an operation section;

searching the plurality of phone book data items, which are stored in the cellular phone, for a second phone number, which is registered in association with the registration name of the first phone number, the second phone number being different from the first phone number, via the communication section, when a destination in the first dialing control using the first phone number does not answer;

acquiring the second phone number, if present in the cellular phone as a result of the searching, from the plurality of phone book data items stored in the cellular phone, via the communication section; and performing a second dialing control by using the acquired second phone number.

11. The in-vehicle handsfree apparatus according to claim 10, wherein the data acquisition section acquires only the second phone number from the plurality of phone book data when the destination in the first dialing control using the first phone number does not answer.

* * * * *